April 12, 1949.  A. CROT  2,466,796
HYDRAULIC CONTROL SYSTEM
Filed Nov. 22, 1944  2 Sheets-Sheet 1
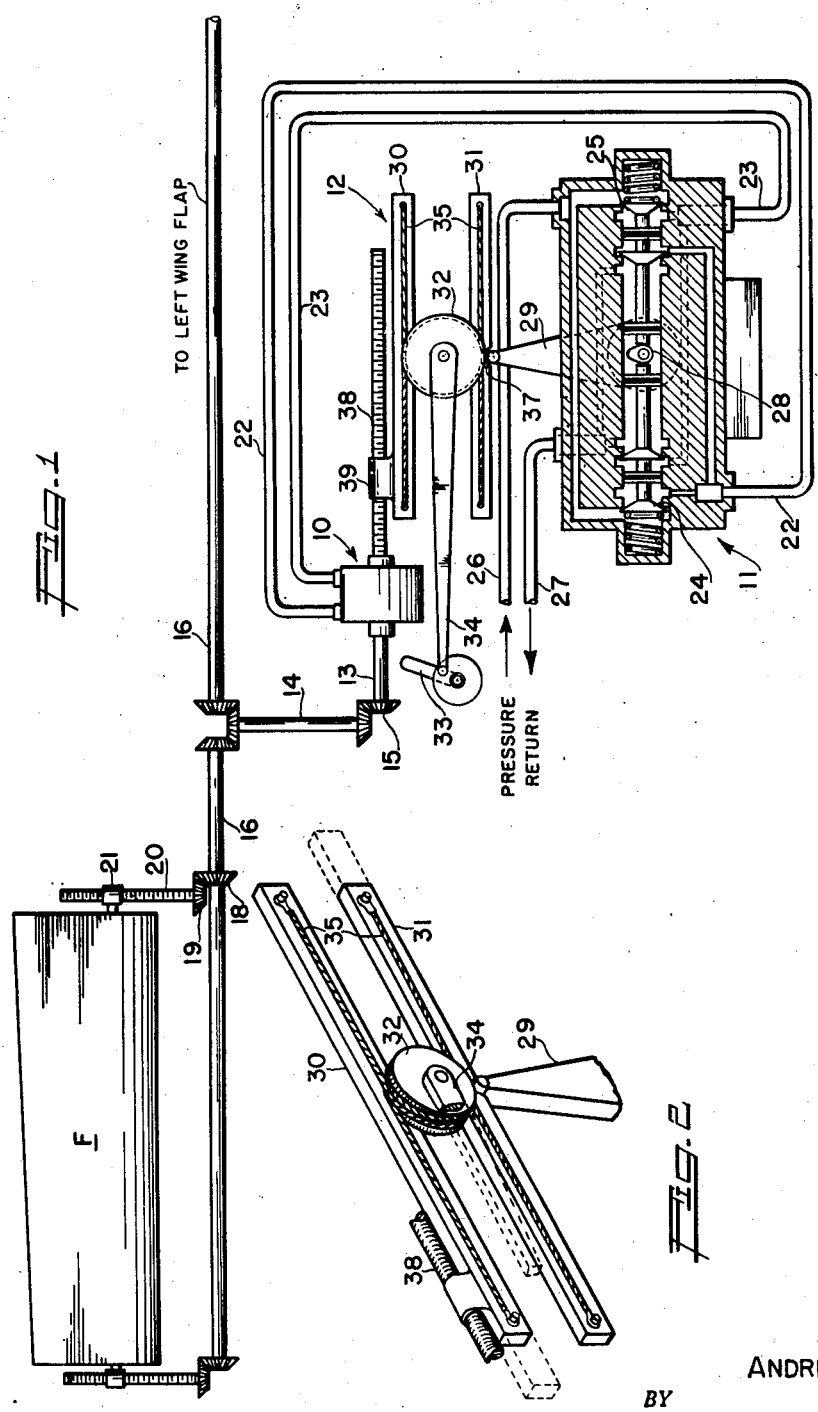
INVENTOR.
ANDRÉ CROT
BY
*George A. Sullivan*
AGENT

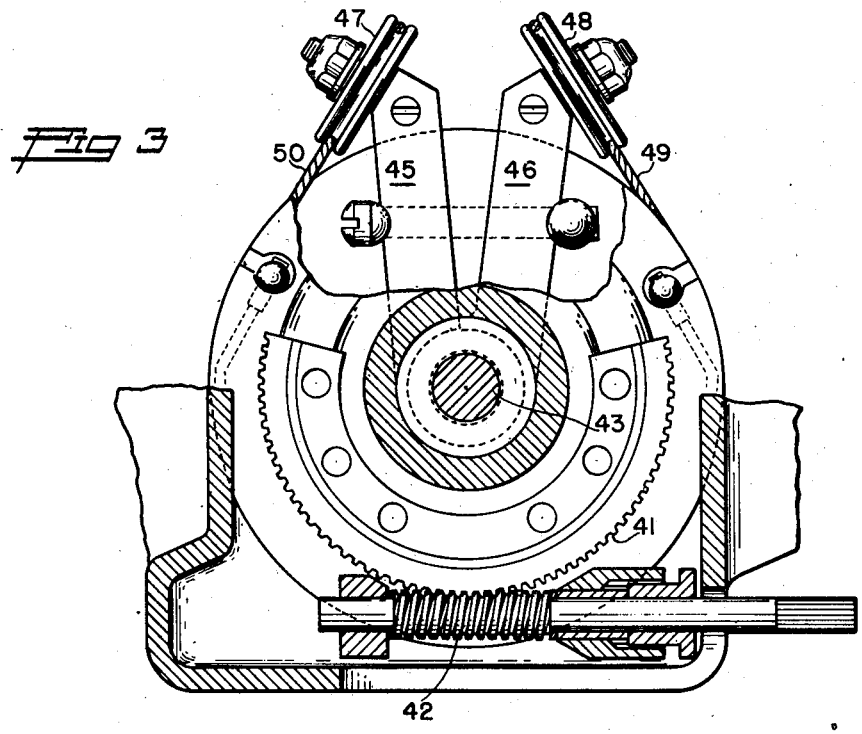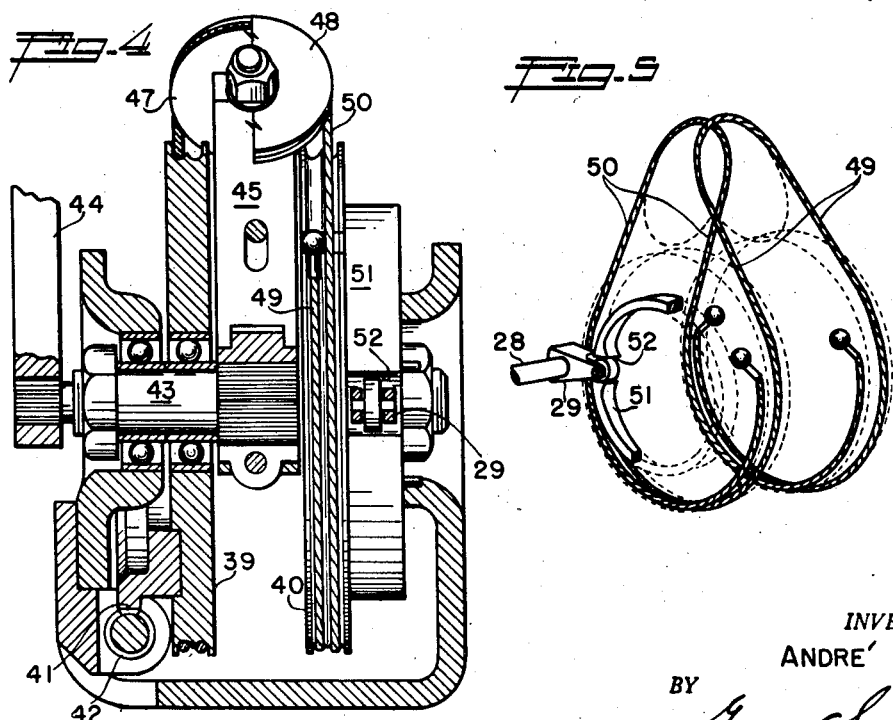

Patented Apr. 12, 1949

2,466,796

UNITED STATES PATENT OFFICE 2,466,796

HYDRAULIC CONTROL SYSTEM

André Crot, Topanga, Calif., assignor to Lockheed Aircraft Corporation, Burbank, Calif.

Application November 22, 1944, Serial No. 564,693

5 Claims. (Cl. 121—41)

This invention relates to remote control systems or operating systems, and relates more particularly to follow-up mechanisms for prepositioning and indicating the operation of remote control systems of the electric or hydraulic types for example.

Hydraulic operating systems are widely used where it is desired to provide for the power operation or control of remotely located elements or devices. Prior systems of this nature have had certain limitations and undesirable characteristics. For example, the follow-up mechanisms commonly employed in hydraulic control or operating systems develop excessive play or lost motion after short periods of usage and are seldom accurate.

One of the objects of this invention is to provide an operating system for remote controls that is dependable and accurate in operation and that is inexpensive to manufacture.

Another object of this invention is to provide a prepositioning system and follow-up mechanism that can be set to stop or lock at any point in its range of movement without further attention from the operator.

Another object of this invention is to provide a system of the character referred to that requires but very little force or physical exertion for its operation, even in instances where the actuating fluid is under high pressures.

Another object of this invention is to provide a remotely controlled power operating system that remains accurate throughout long periods of usage and that may be quickly and easily adjusted without disassembling or disturbing any of its elements.

Another object of this invention is to provide a hydraulic operating system embodying a highly effective follow-up mechanism that is unaffected by wear and temperature variations, and that remains under a substantially uniform tension at all times.

Another object of the invention is to provide a system of the character referred to embodying a follow-up mechanism that is self-adjusting or compensating in the event of leakage in the valve. Leakage in the four-way selector valve of the system is automatically compensated for in the follow-up mechanism and cannot cause actuation or creeping of the remote fluid actuated power unit.

Other objects and advantages of this invention will become apparent from the following detailed description of a typical preferred form of the invention, throughout which description reference may be had to the accompanying drawings in which:

Figure 1 is a schematic or diagrammatic view of the hydraulic operating system of the invention showing it associated with the part to be operated;

Figure 2 is a fragmentary perspective view of the differential mechanism interposed between the follow-up connection and the valve actuation of Figure 1;

Figure 3 is a modified form of differential pulley mechanism, with the housing partly broken away to show the follow-up connection to one pulley;

Figure 4 is a partial section on the line 4—4 of Figure 3 with one pulley shown in elevation; and Figure 5 is a diagrammatic sketch of the cable system linking the two pulleys, including the valve actuating lever operated by one of the pulleys.

The power unit 10 may be any selected form of actuator or power source adapted to be operated by fluid pressure and may be located at any convenient or required point. As diagrammatically illustrated, the power unit 10 is arranged to operate or control the wing flaps F of an airplane. The shaft 13 of the power unit 10 drives a lateral shaft 14 through suitable bevel gearing 15. The shaft 14 in turn drives the flap operating shafts 16 through suitable gearing 17. The shafts 16 carry bevel gears 18 which mesh with gears 19 on screws 20 engaged in nuts 21 on the flaps F. It will be seen that upon rotation of the drive shaft 13 the flaps F are controlled or moved through the shafting and gearing just described. Each shaft 16 may operate one or more flaps F. It is to be understood that the power unit 10 is reversible, being capable of driving the shaft 13 in either direction. Actuating fluid pressure lines 22 and 23 extend from the power unit 10 to the valve 11. The lines 22 and 23 may be considered as the forward or reverse lines, or as the lines of the Number 1 and Number 2 cylinders of the power unit, depending upon the nature of the unit.

The valve 11 is only diagrammatically shown herein, being described and claimed in my companion application Ser. No. 564,692 of even date herewith. For the purposes of the present invention it may be considered to be a conventional four-way hydraulic valve wherein double seated poppets 24 and 25 control both the pressure and return connections 26 and 27, one valve energizing the power unit 10 in one direction and the other valve reversing its direction of rotation. A cam shaft 28 is rocked either way by a lever 29 to open one valve or the other. For the purposes of this invention it is believed to be unnecessary to trace the internal fluid passages in the valve 11 since reference may be had to my companion application for novel details of the specific valve shown.

The follow-up mechanism 12 is provided to control or operate the valve 11. The mechanism 12 is such that it may be actuated by an adjacent or remote operating means, either manual, electrical or mechanical. The follow-up mechanism 12 is interconnected between the power unit 10 and the cam shaft 28 of the valve 11 and includes elements associated with both the power unit and valve 11. As illustrated in Figures 1 and 2 of the drawings, the follow-up mechanism 12 includes a pair of spaced parallel slides 30 and 31. The slides 30 and 31 may be supported in a suitable frame, or the like, for free independent movement along spaced parallel axes. A freely rotatable and bodily movable double sheave or pulley 32 is positioned between the slides 30 and 31. Any suitable or required operating means may be utilized to move the pulley 32. In the simple diagrammatically illustrated structure there is a crank 33 and a link 34 extending from the crank to the shaft of the pulley 32. The crank 33 may be operated by a control cable, or the like, from a remote point.

The pulley 32 is operatively connected with the slides 30 and 31 to move the slide 31 during certain phases of operation. A cable 35 has its opposite ends adjustably secured to corresponding ends of the slide 30 and makes one turn around the pulley 32. A similar cable 36 is adjustably secured to the ends of the slide 31 and makes one turn around the periphery of the pulley 32. It will be seen that upon bodily movement of the pulley 32 to the left as viewed in Figure 1, the lower slide 31 will be moved twice as far to the left, assuming that the upper slide 30 is fixed. In a like manner, bodily movement of the pulley 32 to the right causes the lower slide 31 to be moved to the right a distance twice as great as the travel of the pulley.

An operative connection is provided between the slide 31 and the cam shaft 28 of the valve 11 so that movement of the slide produces rotation of the shaft to control or operate the valve. The outer end of the camshaft lever 29 cooperates with the bottom edge of the slide 31 and the slide has a notch 37 to receive the roller. The notch 37 is V-shaped, having downwardly divergent walls. The parts are formed and related so that when the lever 29 engages in the notch 37 the cam shaft 28 is in a neutral or idle position with the poppets 24 and 25 both closed. When the slide 30 is moved by the pulley 32, the lever 29 is cammed out of the notch 37 on to the lower edge of the slide 31 to rotate the cam shaft 28 so that a poppet 24 or 25 is moved outwardly against the resistance offered by its spring. The poppet remains in the actuated or open position so long as the lever 29 is out of the notch 37 and when the lever re-enters the notch the cam shaft 28 is turned to its neutral position so that the poppet is closed by its spring. It is to be understood that where the valve 11 is used in other applications the lever 29 may be replaced by a handle, pulley or other suitable operating means.

The follow-up mechanism is operatively connected with the power unit 10 so that operation of the unit in a direction, and to an extent corresponding to the direction and extent of operation of the crank 33, restores the cam shaft 28 of the valve 11 to the neutral position where its lever 29 cooperates with the notch 37. This operative connection includes a screw 38 driven by the power unit 10 and a traveler nut 39 on the screw. The screw and nut preferably have accurately ground threads. The traveling nut 39 is fixed to the upper slide 30. The nut 39 being fixed to the slide 30 and being threaded on the screw 38, holds the slide against movement when the power unit 10 is idle and the pulley 32 is bodily moved so that this movement of the pulley produces movement of the lower slide 31, as described above. The connection of the nut 39 with the slide 30 provides for movement of the slide when the power unit 10 operates in response to actuation of the valve 11 and this movement of the slide causes the valve 11 to be restored to its idle position to terminate the operation of the power unit.

When it is desired to move or operate the flaps F, the crank 33 is moved. This produces movement of the pulley 32 and the lower slide 31. Movement of the lower slide cams the lever 29 out of the notch 37 and swings or rotates the lever and its shaft 28. This causes one of the cams to move or open a poppet 24 or 25.

Operation of the power unit 10 causes rotation of the shafts 13, 14 and 16 so that the flaps F are moved. Operation of the power unit 10 also causes rotation of the screw 38 and the nut 39 is caused to travel along the screw. This moves the upper slide 30, and causes movement of the lower slide 31 in the opposite direction. The lower slide 31 is moved so long as the power unit 10 remains in operation. The operation continues until the notch 37 in the lower slide moves to a position to receive the lever 29. When the lever moves into the notch 37, the cam shaft 28 turns to its neutral position allowing the poppet to move back to its closed position under the action of the spring and the unbalanced fluid pressure. Closing of the poppet cuts off the delivery of actuating fluid pressure to the power unit 10 and the unit stops. It is to be observed that restoration of the lower slide 31 does not cause movement of the crank 33. Thus the crank and its operating means at all times accurately indicate the position of the flaps F and in effect afford means for presetting the flap to any desired position.

It is believed that it will be understood how the operating means or crank 33 may be employed to move the lower slide 31 to any desired extent and in either direction to produce the desired movement of the flaps F. It is to be noted that there is no lost motion in the follow-up mechanism 12. The mechanism 12 gives the effect of differential gearing wherein the slides 30 and 31 form racks engaging pinion teeth on pulley 32 without being characterized by the lost motion inherent in such gearing. The cables 35 and 36 of the mechanism 12 may be adjusted or taken up as required to maintain a uniform tension in the mechanism at all times. In the event that leakage occurs in the valve 11, the follow-up mechanism 12 automatically adjusts itself to compensate for such leakage. Such leakage may result in slight "hunting" of the mechanism 12 causing the lever 29 to move into and out of its notch 37 but this has no ill effects on the mechanism. The follow-up mechanism is unaffected by wear and remains accurate and positive indefinitely.

The modified form of the invention shown in Figures 3, 4 and 5 substitutes rotary motion between differentially movable pulleys 39 and 40 for the reciprocating motion of the slides 30 and 31 previously described. The pulley 39 carries a worm gear 41 in operating engagement with a worm 42 which is drivingly connected to the power unit 10 and corresponds to the screw 38 previously described. Both pulleys are freely journaled on a shaft 43 which is intended to be manually or remotely rotated as by a lever 44 which is operated to set the desired flap extension, the partial rotation of shaft 43 corresponding to the bodily shift of the pulley 32 in the previous embodiment. The shaft carries a pair of relatively adjustable arms 45 and 46 between the pulleys 39 and 40, these arms carrying idler pulleys 47 and 48. Cables 49 and 50 are each attached to one pulley 39 or 40 trained over the idler pulleys 47 or 48 and the other pulley 40 or 39 as shown in Figure 5. The arrangement is such that movement of pulley 39 in one direction produces equal and opposite motion of the other pulley 40 when the shaft 43 is stationary. When the shaft 43 is adjusted to another operating position it moves the arms 45 and 46 and the idler pulleys 47 and 48 causing twice the rotative movement in the pulley 40, as the pulley 39 is held stationary by the follow-up worm gearing.

The pulley 40 carries a drum 51, notched at 52 to cooperate with the camshaft lever 29 previously described. When the pulley 40 turns to bring the notch 52 under the lever 29 the movement of the latter thereinto, as shown in Figure 5, neutralizes or centers the hydraulic valve 11 in the same manner as the notch 37 in the slide 31. The slide 31 reciprocated, while the drum 51 rotates, but the result is the same since the lever climbs out of the notch 52 onto the drum surface to unseat one or the other of the poppets 24 or 25 according to the direction of movement of the pulley 40, when actuated by adjustment of the shaft 43. In effect, the operator can move the control to the flap location desired and the subsequent responsive movement of the flap will thereafter act to restore the pulley 40 to its neutral position when the flap has reached a position corresponding to the setting of the control.

While I have described the operation of my follow-up mechanism as operating a hydraulic valve, it will be evident that the lever 29 might equally well operate an electric reversing switch, in which case the power unit 10 would be a reversible electric motor.

Having described typical forms of the invention, I do not wish to be limited to the specific details herein set forth, but wish to reserve to myself any variations or modifications that may appear to those skilled in the art or fall within the scope of the following claims.

I claim:

1. A system for controlling a movable part comprising a reversible fluid pressure actuated power unit for moving said part, a valve for controlling the power unit, and having a turnable operating member, movable control means and a follow-up mechanism including a first slide having a notch to receive said member when the valve is in the neutral position and surfaces at either side of the notch to move and hold the member in the forward and reverse positions, a second slide moved by the power unit, a bodily movable and rotatable pulley, and flexible lines each secured at their ends to one of the slides and looped around the pulley and operable to transmit movement from the pulley to the first slide to bring one or the other of said surfaces into cooperation with said member and operable to transmit movement from said second slide to the first slide to restore the notch into receiving relation to said member.

2. A system for controlling a movable part comprising a reversible fluid pressure actuated power unit for moving said part, a valve for controlling the power unit, and having a turnable operating member, movable control means and a follow-up mechanism including a first slide having a notch to receive said member when the valve is in the neutral position and surfaces at either side of the notch to move and hold the member in the forward and reverse positions, a second slide, screw thread means operated by the power unit to move the second slide, a bodily movable and rotatable pulley, and flexible lines each secured at their ends to one of the slides and looped around the pulley and operable to transmit movement from the pulley to the first slide to bring one or the other of said surfaces into cooperation with said member and operable to transmit movement from said second slide to the first slide to restore the notch into receiving relation to said member.

3. A system for controlling a movable part comprising a reversible power unit for moving said part, means for supplying power to said power unit for operation thereof in either direction, movable control means for said first mentioned means, and a follow-up mechanism including a first member having a notch to receive said control means when in its neutral position and surfaces at either side of the notch to move and hold said control means in the forward and reverse positions thereof, a second member moved by the power unit, an intermediate member operatively disposed between said first and second members, and a pair of flexible lines each secured at one end to one of said members and at the other end to the other of said members and intermediately engaging said intermediate member, said flexible lines being so arranged as to produce an equal and opposite motion of the first member upon motion of the second member, whereby to bring one or the other of said surfaces into cooperation with said control means to restore the notch into receiving relation to said control member.

4. A system for controlling a movable part comprising a reversible power unit for moving said part, means for supplying power to said power unit for operation thereof in either direction, movable control means for said first mentioned means, and a follow-up mechanism including a first member having a notch to receive said control means when in its neutral position and surfaces at either side of the notch to move and hold said control means in the forward and reverse positions thereof, a second member moved by the power unit, an intermediate member operatively disposed between said first and second members, and a pair of flexible lines each secured at one end to one of said members and at the other end to the other of said members and intermediately engaging said intermediate member, said flexible lines being so arranged as to produce an equal and opposite motion of the first member upon motion of the second member, whereby to bring one or the other of said surfaces into cooperation with said control means to restore the notch into receiving relation to said control member, and means for manually adjusting the position of said intermediate member whereby to initially displace said first member and control means from the latter's neutral position.

5. A system for controlling a movable part comprising a reversible fluid pressure actuated power unit for moving said part, a valve for controlling the power unit, and having a turnable operating member, movable control means and a follow-up mechanism including a first slide having a notch to receive said member when the valve is in the neutral position and surfaces at either side of the notch to move and hold the member in the forward and reverse positions, a second slide moved by the power unit, a bodily movable and rotatable pulley, and flexible lines each secured at their ends to one of the slides and looped around the pulley and operable to transmit movement from the pulley to the first slide to bring one or the other of said surfaces into cooperation with said member and operable to transmit movement from said second slide to the first slide to restore the notch into receiving relation to said member, and means for manually adjusting the position of said bodily movable pulley whereby to initially displace said first slide and movable control means from the latter's neutral position.

ANDRÉ CROT.

REFERENCES CITED

The following references are of record in the file of this patent:

UNITED STATES PATENTS

| Number | Name | Date |
|---|---|---|
| 439,763 | Purvis | Nov. 4, 1890 |
| 525,693 | Cole | Sept. 11, 1894 |
| 526,930 | Maxon | Oct. 2, 1894 |
| 1,065,323 | Gottschalk | June 17, 1913 |
| 1,119,324 | Sprater | Dec. 1, 1914 |
| 1,272,459 | Kitts | July 16, 1918 |
| 1,742,946 | Bertram | Jan. 7, 1930 |
| 1,906,222 | Boland | May 2, 1933 |
| 2,159,142 | Fischer | May 23, 1939 |
| 2,388,581 | Soffietti | Nov. 6, 1945 |

FOREIGN PATENTS

| Number | Country | Date |
|---|---|---|
| 5,430 | Great Britain | 1896 |